(12) United States Patent
Bleikolm et al.

(10) Patent No.: US 8,998,265 B2
(45) Date of Patent: Apr. 7, 2015

(54) PAIRED OPTICALLY VARIABLE SECURITY ELEMENT

(75) Inventors: Anton Bleikolm, Ecublens (CH); Pierre Degott, Crissier (CH); Edgar Mueller, Fribourg (CH)

(73) Assignee: Sicpa Holding SA, Prilly (CH)

( * ) Notice: Subject to any disclaimer, the term of this patent is extended or adjusted under 35 U.S.C. 154(b) by 657 days.

(21) Appl. No.: 13/122,285

(22) PCT Filed: Sep. 16, 2009

(86) PCT No.: PCT/EP2009/062021
§ 371 (c)(1),
(2), (4) Date: May 13, 2011

(87) PCT Pub. No.: WO2010/037638
PCT Pub. Date: Apr. 8, 2010

(65) Prior Publication Data
US 2011/0215562 A1 Sep. 8, 2011

(30) Foreign Application Priority Data

Oct. 3, 2008 (WO) .................. PCT/IB2008/002620

(51) Int. Cl.
*B42D 15/00* (2006.01)
*B42D 15/10* (2006.01)
*G02B 5/28* (2006.01)
*B44F 1/10* (2006.01)
*B42D 25/29* (2014.01)

(52) U.S. Cl.
CPC ............ *G02B 5/286* (2013.01); *B42D 2035/24* (2013.01); *B42D 2035/26* (2013.01); *B44F 1/10* (2013.01); *B42D 25/29* (2014.10)

(58) Field of Classification Search
USPC ......................................... 283/72, 81, 94, 98
See application file for complete search history.

(56) References Cited

U.S. PATENT DOCUMENTS

| 5,766,738 | A | * | 6/1998 | Phillips et al. ................. 428/200 |
| 6,114,018 | A | | 9/2000 | Phillips et al. |
| 6,399,228 | B1 | | 6/2002 | Simpson |
| 6,472,455 | B1 | | 10/2002 | Bleikolm et al. |
| 6,545,809 | B1 | | 4/2003 | Phillips |

(Continued)

FOREIGN PATENT DOCUMENTS

| WO | 96/39307 | 12/1996 |
| WO | 98/12583 | 3/1998 |

(Continued)

OTHER PUBLICATIONS

English language translation of Taiwan Office action conducted in counterpart Taiwan Appln. No. 98133354 (Jun. 10, 2014).

*Primary Examiner* — Shelley Self
*Assistant Examiner* — Justin V Lewis
(74) *Attorney, Agent, or Firm* — Greenblum & Bernstein, P.L.C.

(57) ABSTRACT

Paired optically variable security element which includes first and second optically variable thin-film multilayer interference devices in the form of optically variable foils or of printings made with inks having optically variable interference pigments. The first and second interference devices exhibit spectral matching at a determined angle of incidence. Sets of optically variable devices and of coating compositions include optically variable pigments for the production of the paired optically variable security element. Moreover, the security element can be used for the protection of documents and goods, and security documents and goods.

7 Claims, 3 Drawing Sheets

(56) References Cited

U.S. PATENT DOCUMENTS

| | | |
|---|---|---|
| 6,833,959 B2 | 12/2004 | Phillips |
| 2003/0137736 A1 | 7/2003 | Phillips |
| 2003/0137737 A1 | 7/2003 | Phillips |
| 2004/0165272 A1 | 8/2004 | Phillips |
| 2009/0278345 A1* | 11/2009 | Despland et al. ............... 283/91 |
| 2010/0194091 A1* | 8/2010 | Heim et al. .................... 283/85 |

FOREIGN PATENT DOCUMENTS

| | | |
|---|---|---|
| WO | 00/22049 | 4/2000 |
| WO | 01/29137 | 4/2001 |
| WO | 2005/044583 | 5/2005 |
| WO | WO 2006117271 A1 * | 11/2006 |
| WO | WO 2008049533 A2 * | 5/2008 |

* cited by examiner a          b          c

90°          45°          30°

PAIRED OPTICALLY VARIABLE SECURITY ELEMENT

FIELD OF INVENTION

The present invention is in the field of security documents. It concerns a paired optically variable security element which comprises first and second optically variable interference devices in the form of optically variable foils or of printings made with ink comprising optically variable interference pigments, wherein said first and second interference devices exhibit spectral matching at a determined angle of incidence. Sets of optically variable devices and of inks or coating compositions comprising optically variable pigments for the production of said paired optically variable security element are also disclosed, as well as the use of said security element for the protection of documents and goods, and security documents and goods carrying said security element.

BACKGROUND OF THE INVENTION

Optically variable foils, optically variable pigments (OVP), and coating compositions comprising OVP, noteworthy optically variable ink (OVI®), are known in the field of security printing. Such optically variable elements exhibit a viewing-angle or incidence-angle dependent color, and are a preferred choice to protect banknotes and other security documents against the illegal reproduction by commonly available color scanning, printing, and copying office equipment.

To enhance the counterfeit resistance and the ease of visual authentication of documents protected by optically variable security elements, it has been proposed to combine, on a same document, more than one optically variable feature. WO 2005/044583 discloses the use of a same optically variable security element in more than one constituting parts of a security document. WO 96/39307 discloses a paired optically variable device, comprising first and second optically variable devices in spaced apart positions on a same surface, having first and second optically variable pigments disposed in said first and second optically variable devices, respectively, wherein said optically variable pigments have the same color at one determined angle of incidence, and different colors at all other angles of incidence.

The device of WO 96/39307 is characterized in that the designs for the paired optically variable pigments are selected such that, in the (CIELAB) a*b* diagrams, representing the color of the said pigments as a function of the viewing or incidence angle, there are crossover points corresponding to viewing or incidence angles at which two of said optically variable pigments have the same hue. The first and the second optically variable pigments of WO 96/39307 are embodied, in the case of all-dielectric interference pigments, as different quarter-wave designs at an approximately same design wavelength. In the case of metal-dielectric interference pigments, the first and the second pigments are embodied as different half-wave designs at an approximately same design wavelength.

The principal shortcoming of the device of WO 96/39307 is that the required "same hue" of the first and the second pigment at one determined angle of incidence must be produced through different spectral characteristics, because it is impossible to realize the same spectral characteristics using different quarter-wave or half-wave designs. The observed hue merely represents the projection of the pigment's spectral reflection characteristics, i.e. the reflection intensity as a function of wavelength, onto the 3-dimensional space of human color perception, and, as known to the skilled person, different spectral characteristics can have the same projection onto the space of human color perception (color metamerism).

A consequence of this fact is that the perceived colors of the first and the second optically variable pigments used in WO 96/39307 depend in a different way on the spectral characteristics of the illumination source, such that a said crossover point, at which two said optically variable pigments have the same hue, may only be observable under a determined type of light source (e.g. incandescent light), and not appear under a different type of light source (e.g. fluorescent light).

It is the object of the present invention to overcome this shortcoming of the prior art, and to disclose a true paired optically variable security element which always exhibits color matching at a determined angle of incidence, independent of the illumination source used.

SUMMARY OF THE INVENTION

The invention is now explained with reference to the following disclosure and claims.

According to the present invention the stated technical problem is solved by a paired optically variable security element having first and second optically variable interference devices, embodied e.g. as first and second optically variable foils, or first and second optically variable pigments in an ink or coating composition, which devices are arranged such that they can be viewed together, and which exhibit a true spectral matching at a determined angle of incidence, whilst having different spectra at all other angles of incidence.

The paired optically variable security element of the present invention comprises thus at least a first and a second optically variable interference device, said interference devices having different color travels, and being embodied either as all-dielectric multilayer stacks, or as metal-dielectric multilayer stacks, or as cholesteric (i.e. chiral nematic) liquid crystal films, or as combinations thereof. Said interference devices are further characterized in that they have a same, e.g. a quarter-wave or a half-wave, interference design at the angle of incidence of spectral matching (crossover point), and in that they differ in the refractive index of at least one of their constituting dielectric layers.

The present invention relies on the fact that the color travel of an interference device depends on the refractive index of the dielectric materials comprised in the device. This dependency is a physical law, related to the difference in light propagation speed inside and outside the different layers of the interference device, and therefore applies to all type of color-shifting optical interference devices, be they of the all-dielectric multilayer thin-film, of the metal-dielectric multilayer thin-film, or of the cholesteric liquid crystal type.

"Color travel" and "color-shift", within the present disclosure, mean the color change which is observed when turning the optically variable interference device from orthogonal to grazing incidence. "Color travel" more precisely refers to the color of the said device as a function of the viewing or incidence angle the in the (CIELAB) a*b* diagram, whereas "color-shift" only refers to the changing visual appearance of the device. "Optically variable", in the context of the present disclosure, refers to the property of viewing- or incidence-angle dependency of color.

"Orthogonal incidence" means viewing at an angle of 80° to 90° with respect to the plane of the interference device. "Grazing incidence" means viewing at an angle of 0° to 10° with respect to the plane of the interference device. Illuminating under specular conditions is generally assumed.

A "crossover point" is a viewing or incidence angle at which said first and second optically variable devices have the same hue in the (CIELAB) a*b* diagram.

"Spectral matching", within the present disclosure, means that the spectral reflection or transmission characteristics, as a function of the wavelength, are qualitatively similar; i.e. that the spectral characteristics of the first and the second optically variable interference device exhibit the same spectral bands, at the same wavelengths, and having the same broadness. "Spectral matching", in the following, does not mean that the spectral bands of the first and the second optically variable device have the same absolute intensities. In fact, different absolute reflection or transmission intensities of the first and the second device, such as can have their origin in the use of different materials, or in differing pigment loadings, are admissible in the context of present invention.

The origin of the reflection color, as well as of the observed color shift with angle, of the herein contemplated interference devices is in the following explained at the example of a half-wave-design metal-dielectric thin-film interference device. Similar reasoning applies, with the necessary change, for the transmission color of interference devices used in translucency, as well as for the other types of interference devices, namely the quarter-wave designs, the all-dielectric thin-film devices, the cholesteric liquid crystal films, and the possible combinations of such devices and designs.

A half-wave-design metal-dielectric thin-film interference device is characterized in that it comprises an "absorber/dielectric/reflector" layer structure, wherein the "absorber" layer is partially transmitting and partially reflecting, the dielectric layer is transmitting, and the reflecting layer is reflecting the incoming light. An illustrative embodiment of such device is given by a layer sequence and thickness of: "Chromium (5 nm)/Magnesium fluoride (400 nm)/Aluminum (40 nm)".

Referring to FIG. 1, the apparent optical thickness ("optical lag" OL) of a dielectric layer (D) of refractive index n>1 equals to $OL=n*d*\sin(\theta')$, wherein $\theta'$ denotes the incidence angle of the light, with respect to the plane of the layer, inside the layer (D). The optical lag is largest (n*d) at orthogonal incidence ($\theta'=90°$, and decreases with decreasing incidence angle towards a minimum value of zero at grazing incidence ($\theta'=0°$). A light wave traveling forth through the dielectric (D), being reflected at the reflector layer (R), and traveling back through the dielectric (D), lags thus behind a light wave reflected at the topmost absorber layer (A) by an amount of $2*OL=2*n*d*\sin(\theta')$, as seen from inside the layer (D).

By virtue of Snellius' law of refraction, $\sin(\theta')$ can be expressed as a function of the incidence angle $\theta$, with respect to the plane of the layer, outside the layer. Assuming an outside refractive index of 1 (air), the optical lag as a function of $\theta$ is then $OL=d*\sqrt{(n^2-\cos^2(\theta))}$. The optical lag of the dielectric layer (D), as seen from outside of the layer, is largest (n*d) at orthogonal incidence ($\theta=)90°$ and decreases with decreasing incidence angle towards a minimum value of $d*\sqrt{(n^2-1)}$ at grazing incidence ($\theta=0°$). A light wave traveling forth through the dielectric (D), being reflected at the reflector layer (R), and traveling back through the dielectric (D), lags thus behind a light wave reflected at the topmost absorber layer (A) by an amount of $2*OL=2*d*\sqrt{(n^2-\cos^2(\theta))}$, as seen from outside the layer (D). The root sign $\sqrt{}$ denotes herein the square root of the following argument in parentheses.

The total amount of light intensity (R) reflected by the interference device, as a function of the incidence wavelength ($\lambda$), grossly varies as $R(\lambda)=I_{max}*\cos^2((2*OL*\pi)/\lambda)$, wherein $I_{max}$ is the maximum intensity of reflection. In addition to the reflection occurring for very large values of $\lambda$, (reflection of long-wave radiation), the device has pronounced reflection maxima at $OL=\lambda/2$ (first order), $\lambda$ (second order), $3\lambda/2$ (third order), $2\lambda$ (fourth order), $5\lambda/2$ (fifth order), ... $k*\lambda/2$ ($k^{th}$ order), i.e. for all multiple "half-waves".

It is readily apparent from this series, that a device originating from a 660 nm half-wave design, i.e. having its first reflection maximum at 660 nm wavelength (in the red), will have its second reflection maximum at 330 nm wavelength (in the UV), whereas a device originating from a 1320 nm half-wave design, i.e. having its second reflection maximum at 660 nm wavelength, will have its third reflection maximum at 440 nm wavelength (in the blue), and a device originating from a 1980 nm half-wave design, i.e. having its third reflection maximum at 660 nm wavelength, will have its fourth reflection maximum at 495 nm wavelength (in the green). It is therefore obvious that apparently same reflection colors originating from interference devices of different half-wave design are necessarily metameric, i.e. their matching or not-matching always depends on the illumination conditions.

From the facts stated above it becomes evident that the two reflection spectra of the paired optically variable security element disclosed in WO 96/39307, which is based on first and second optically variable pigments originating from different quarter-wave or half-wave designs, cannot be matched with each other (compare, e.g. FIG. 2a and FIG. 2c, showing the spectra of a $3^{rd}$ order green and a $2^{nd}$ order green, respectively). Color matching does in such case merely address the projection of these reflection spectra onto the 3-dimensional space of human color perception, and the perceived color remains intrinsically dependent on the employed illumination conditions.

According to the present invention, the paired optically variable security element is based on first and second optically variable pigments originating from a same interference design, e.g. a same quarter-wave or a same half-wave design, at the angle of incidence of spectral matching (crossover point). In order to provide for a crossover point in the (CIELAB) a*b* diagram, at which the said first and second optically variable pigments have the same hue, the refractive indices of at least one of the constituting dielectric layers of the first and second optically variable pigments must be chosen different, thus resulting in a different color shift with incidence angle, whilst having the same spectral reflection or transmission characteristics, i.e. truly a same color, at the crossover point.

This is the case for a viewing, or incidence angle $\theta$ which fulfils the relation $d_1*\sqrt{(n_1^2-\cos^2(\theta))}=d_2*\sqrt{(n_2^2-\cos^2(\theta))}$, wherein $d_1$, $n_1$, and $d_2$, $n_2$ are the thicknesses and the refractive indices of the dielectric layers of the first and the second interference device, respectively.

Thus, the color matching in the present case is a true, exact match of spectral reflection or transmission characteristics at a determined angle of incidence, and the authentication of a document or item through the matching colors of both parts of the paired optically variable security element disclosed herein at a determined angle of incidence does not depend on the chosen illumination conditions.

The amount of "color-shift" with angle, which is exhibited by an optically variable interference device, depends noteworthy on the refractive index of its dielectric layer or layers, and can be estimated for the contemplated metal-dielectric half-wave design from the ratio (r(n)) of apparent optical thicknesses ("optical lags") at orthogonal and at grazing incidence, $r(n)=n/\sqrt{(n^2-1)}$, which is a function of the refractive index n of the dielectric layer, and which corresponds to the ratio of peak reflection wavelengths at orthogonal and grazing views (√ denotes the square root of the following argument in parentheses).

Table 1, illustrates the calculated value of $r(n)=\lambda_{orthogonal}/\lambda_{grazing}$ as a function of the refractive index n:

TABLE 1

| n | r(n) |
|---|---|
| 1.00 | infinite |
| 1.05 | 3.28 |
| 1.10 | 2.40 |
| 1.15 | 2.03 |
| 1.20 | 1.81 |
| 1.25 | 1.67 |
| 1.30 | 1.57 |
| 1.35 | 1.49 |
| 1.40 | 1.43 |
| 1.45 | 1.38 |
| 1.50 | 1.34 |
| 1.55 | 1.31 |
| 1.60 | 1.28 |
| 1.65 | 1.26 |
| 1.70 | 1.24 |
| 1.75 | 1.22 |
| 1.80 | 1.20 |
| 1.85 | 1.19 |
| 1.90 | 1.18 |
| infinite | 1.00 |

The paired optically variable security element of the present invention comprises thus a first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and a second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, the security element being characterized in that in that the range spanned up by said third and said fourth wavelengths of said second device is within the range spanned up by said first and said second wavelengths of said first device. This latter aspect is a necessary condition for the existence of an angle of incidence, under which said $k^{th}$-order reflection maxima of said first and said second interference device coincide.

The first and second optically variable interference devices must be of the same half-wave or quarter-wave design, in order to produce a spectral matching, and can be embodied by a design chosen from the group consisting of the all-dielectric multilayer stacks, the metal-dielectric multilayer stacks, the cholesteric liquid crystal films, and the combinations thereof.

In a particular embodiment of the security element of the present invention, the said interference devices are embodied by optically variable foils. In case of metal-dielectric interference devices, the optically variable foils may comprise an "absorber/dielectric/reflector" layer sequence, wherein the reflector layer may be followed by further layers, and means to affix the foil to a substrate such that the "absorber" layer is on the outside.

In another particular embodiment of the security element of the present invention, the said interference devices are embodied by optically variable pigments comprised in corresponding inks or coating compositions and applied to a document or good to be protected. In case of metal-dielectric interference devices, the optically variable pigments may comprise an "absorber/dielectric/reflector/dielectric/absorber" layer sequence, wherein the reflector layer may comprise further, internal layers.

In a further particular embodiment, the optically variable pigment is incorporated into plastic foils, so as to result in another type of optically variable foils. The optically variable pigment can herein either be incorporated into the plastic mass used to cast the foil and oriented through a controlled stretching of the foil (e.g. through calendering). Alternatively, the optically variable pigment can be laminated between two plastic foils, to make up a single optically variable foil.

A combination of inks or coatings comprising optically variable pigments, foils containing optically variable pigment, and optically variable foils can also be used to embody the security element of the present invention, foreseen that the required spectral matching conditions are fulfilled.

The security element can furthermore be embodied in or on a transparent or a translucent substrate, for viewing in translucency, or on an opaque substrate, for viewing in reflection.

More particularly, the security element of the present invention can be embodied in the forms of optically variable printings made with ink on a substrate, of optically variable foils affixed to a substrate, of security threads incorporated into a substrate, or of transparent window substrates.

Disclosed is also a process for making a paired optically variable security element, the process comprising the steps of
applying to a substrate (S) a first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence;
applying to said substrate (S) a second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence;
wherein said first and said second optically variable device are selected such that the range spanned up by said third and said fourth wavelengths of said second device is within the range spanned up by said first and said second wavelengths of said first device.

The first and the second optically variable interference devices are of the same half-wave or quarter-wave design and preferably arranged such that they can be viewed together.

The paired optically variable security element according to the present invention can be used for the counterfeit-protection of a document, such as a banknote, a value document, an identity document, an access document, a label, or a tax excise stamp, as well as for the marking of a good.

Disclosed is also a security document, such as a banknote, a value document, an identity document, an access document, or a tax excise stamp, which comprises a paired optically variable security element according to present invention.

The present invention comprises also a set of first and second optically variable interference devices for embodying a paired optically variable security element, said first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and said second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, wherein the range spanned up by said third and said fourth wavelengths of said second device is within the range spanned up by said first and said second wavelengths of said first device.

In particular, said first and said second optically variable interference device can be chosen from the group consisting of the optically variable foils, the optically variable threads, and the optically variable windows.

The invention comprises further a set of first and second optically variable coating compositions, in particular inks, for embodying a paired optically variable security element, said first coating composition containing a first optically variable interference pigment having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and said second coating composition containing a second optically variable interference pigment having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, wherein the range spanned up by said third and said fourth wavelengths of said second pigment is within the range spanned up by said first and said second wavelengths of said first pigment.

In particular, said first and said second optically variable coating composition can be chosen from the group consisting of the screen printing inks, the copperplate-intaglio inks and the gravure printing inks.

DETAILED DESCRIPTION AND EXEMPLARY EMBODIMENTS

Figure 1:
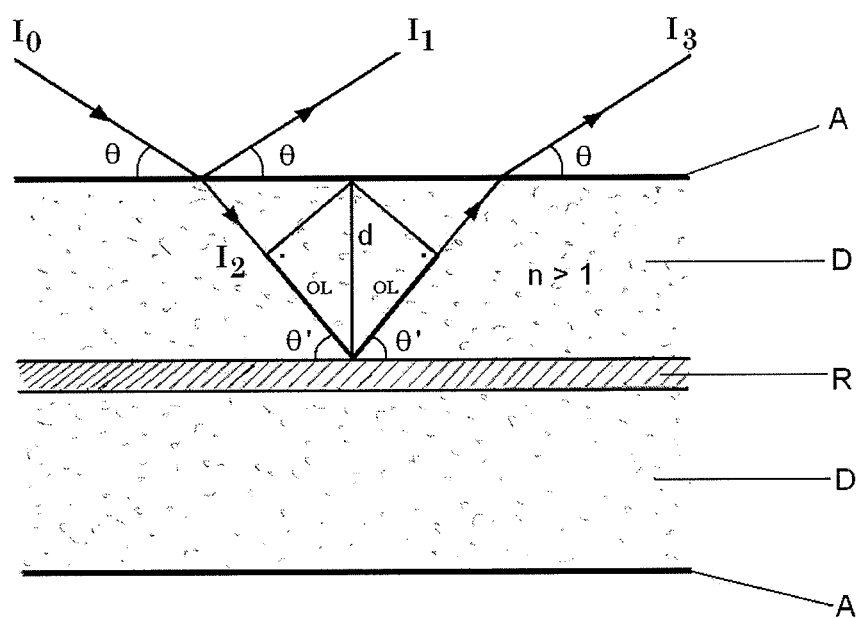
FIG. 1 illustrates the origin of the perceived color and color-shift of an absorber/dielectric/reflector/thin-film multi-layer stack, such as can be used in the present invention.

The invention is now explained with the help of the figures and of exemplary embodiments:

FIG. 1 illustrates the origin of the perceived color and color-shift of an absorber/dielectric/reflector/thin-film multi-layer stack, such as can be used in the present invention: a reflector layer (R), which may have an internal layer structure, carries at least one dielectric layer (D), which, in turn, carries at its outer surface an absorber layer (A). Incident light ($I_0$), falling onto the device under incidence angle θ, is split at the absorber layer (A) into a primary reflected beam ($I_1$) and a primary transmitted beam ($I_2$); the latter travels forth through the dielectric layer (D) under incidence angle θ', modified by refraction, is reflected at the reflector layer (R), travels back through the dielectric layer (D) and the absorber layer (A), and finally exits the device as a secondary reflected beam ($I_3$) under incidence angle θ. The primary reflected beam ($I_1$) and the secondary reflected beam ($I_3$) interfere with each other, causing certain wavelengths to be partially or totally extinguished and others not (destructive and constructive interference), hence producing the appearance of color through the selective reflection of particular parts of the white-light spectrum.

Convenient dielectric materials for embodying an interference device of the all-dielectric design or the metal-dielectric design are known to the skilled person and can be found in the specialized literature, e.g. H. Angus Macleod, "Thin-Film Optical Filters, $3^{rd}$ edition, chapter 15; Table 2, hereafter, gives optical parameters of exemplary dielectric materials which are useful to embody the present invention.

TABLE 2

Data taken from M. Ohring, *The Material Science of Thin Films*, Academic Press, Inc., Boston, 1992.

| Composition | Packing density | Transmittance Range (μm) | Refractive index |
|---|---|---|---|
| NaF | 1 | 0.15-14 | 1.3 |
| LiF | 1 | 0.10-8 | 1.3 |
| CaF$_2$ | 0.57-1.00 | 0.15-12 | 1.23-1.46 |
| AlF$_3$ | 0.64 | 0.2-14 | 1.23 |
| MgF$_2$ | 0.72-0.80 | 0.11-4 | 1.32-1.39 |
| LaF$_3$ | 0.80 | 0.25-2 | 1.55 |
| CeF$_3$ | 0.80 | 0.3-5 | 1.63 |
| SiO$_2$ | 0.9 | 0.2-9 | 1.45 |
| Al$_2$O$_3$ | 1 | 0.2-7 | 1.54 |
| MgO | 1 | 0.2-8 | 1.7 |
| Y$_2$O$_3$ | 1 | 0.3-12 | 1.89 |
| La$_2$O$_3$ | 1 | 0.3-12 | 1.98 |
| CeO$_2$ | 1 | 0.4-12 | 2.2 |
| ZrO$_2$ | 0.67 | 0.34-12 | 1.97 |
| ZnO | 1 | 0.4-3 | 2.1 |
| TiO$_2$ | 1 | 0.4-3 | 1.9 |

Optically variable thin-film interference devices having an all-dielectric or a metal-dielectric design can be produced, as known to the skilled person, by the successive physical-vapor-deposition (PVD) of the different materials constituting the thin-film device onto a suitable carrier substrate, such as described in U.S. Pat. No. 4,705,356; U.S. Pat. No. 4,838,648; U.S. Pat. No. 4,930,866; U.S. Pat. No. 5,084,351; U.S. Pat. No. 5,214,530; U.S. Pat. No. 5,278,590; EP-B-0 227 423; as well as in EP-B-1 366 380 and the hereto related documents.

The carrier is preferably a flexible web, e.g. a release-coated polyethylene terephthalate (PET) foil. The vapor-deposition can be carried out as a roll-to-roll process in a high vacuum coater. The materials are evaporated using material-specific, appropriate evaporation sources and processes known to the skilled person, such as sputtering, reactive sputtering, magnetron sputtering, thermal evaporation, electron-beam or laser-beam assisted evaporation.

Other ways of depositing the layers of the thin-film device include chemical vapor deposition (CVD) and wet coating, in particular sol-gel coating processes. Whereas in physical vapor deposition (PVD), the material to be deposited is merely evaporated from the source and condenses on the substrate, chemical vapor deposition (CVD) implies a chemical reaction of one or more precursor compounds at the (generally heated or otherwise energized) substrate surface. The borderline case of reactive sputtering, wherein a precursor material (e.g. Ti) is sputtered from a source and reacts with a present gas phase (e.g. $O_2$) under reduced pressure, depositing as a reaction product (e.g. $TiO_2$) on the substrate, is hereafter counted to the physical vapor deposition processes, because it takes place under PVD-like process conditions and results in a PVD-like deposit.

Cholesteric liquid crystal films are known from WO9409086A1, EP0601483A1, U.S. Pat. No. 5,502,206, EP0661287B1, EP0686674B1, U.S. Pat. No. 5,683,622, EP0709445B1, EP0712013A2, WO9729399A1, EP0875525A1, EP0885945A1, as well as from related documents known to the skilled person. Such foils are obtained by coating a carrier foil with a polymerizable cholesteric liquid crystal precursor mixture, followed by orienting the liquid crystal in the cholesteric phase at an appropriate temperature and fixing it by polymerization, e.g. by UV-curing. Corresponding cholesteric liquid crystal polymer (CLCP) pigments are obtained from such foil by comminuting it to the desired particle size. Coating compositions containing such pigments are disclosed in U.S. Pat. No. 5,807,497, EP0758362A1, WO9532247A1, EP0887398A1, as well as in related documents known to the skilled in the art.

The refractive index of the cholesteric liquid crystal polymer can be varied through an appropriate choice of the chemistry used. A high number of cross-linkable monomers and oligomers are noteworthy known to form cholesteric phases under appropriate conditions, which phases can be "frozen" in a determined state through radiation-induced or otherwise induced cross-linking reactions. Monomers and oligomers which are free of aromatic residues like benzene, naphthalene and other conjugated cycles result in low-refractive-index cholesteric liquid crystal polymers. Examples of this type are the liquid crystal polymers derived from cholesterol. On the other hand, monomers and oligomers containing aromatic residues like benzene, naphthalene and other conjugated cycles result in high-refractive-index cholesteric liquid crystal polymers. Examples of this type are the polymers described in EP-B 0 685 749 and in EP-B 0 760 836.

In a particular embodiment, a previously embossed and release-coated carrier foil, e.g. of PET, is employed. The embossing is carried out with the help of a heated embossing shim, as known to the person skilled in the manufacturing of surface holograms. The embossed relief pattern in the carrier foil is subsequently reproduced by the optically variable multilayer interference device which is vapor-deposited on top of this carrier foil, or by the liquid crystal film which is produced on top of this carrier foil.

The carrier foil coated with an optically variable interference device can also be converted, according to known procedures, to a hot- or cold-stamping transfer foil for the copy-protection of documents.

Most preferably, however, the optically variable interference device film is detached from the carrier foil and comminuted into pigment, so as to result in pigment flakes having a particle size ranging from 200 nm to 3'000 nm thickness, preferably ranging from 400 nm to 5000 nm thickness and a particle diameter ranging from 5 to 50 micrometers extension. Said comminution can be advantageously performed with the help of a jet mill, and the resulting particles are preferably classified into appropriate size fractions.

The resulting optically variable pigment is preferably formulated into a printing ink, which may comprise it in amounts ranging from 1% to 25% by weight, together with at least one organic polymer or polymer precursor as a binder, and, where appropriate, other types of pigments, in particular coated particles and/or iridescent pigments, conventional dyes, inorganic and organic printing pigments such as described in O. Lütickert, *Pigment+Füillstoff Tabellen*, $5^{th}$ edition, Laatzen, 1994, as well as extenders, rheology additives, solvents, photosensitizers and siccativating agents. Other security materials may also be present in the ink, such as magnetic pigments, luminescent pigments or dyes, and infrared-absorbing pigments or dyes, etc.

The ink composition is preferably formulated for the screen-printing process, such as to have a viscosity in the range of 0.5 to 2 Pa·s at 40° C.; however, other preferred options include inks for the copperplate-intaglio printing process, having a viscosity in the range of 2 to 20 Pa·s at 40° C. and inks for the flexo gravure printing process, having a viscosity in the range of 0.1 to 0.5 Pa·s at 40° C. The formulation of such inks is known to the skilled person.

The resulting optically variable inks can be used for the printing of indicia on an item to be protected, e.g. a security document, said indicia being embodied as a paired optically variable device such that they can be viewed together. The so obtained, optically variable security feature is easily detected by the human eye, e.g. by comparing both optically variable devices forming the paired optically variable feature and checking for a determined incidence angle where they have the same spectral reflection or transmission characteristics. Such comparison, which is truly independent of the environment lighting conditions, allows, by simple visual examination, to judge the authenticity of a document carrying the paired optically variable security feature of the present invention.

In a further embodiment of the present invention, magnetic optically variable pigment (e.g. according to U.S. Pat. No. 4,838,648 or EP-B-1 366 380) is used, and the magnetic pigment flakes in the ink are further oriented (e.g. according to EP-B-1 641 624), during or after the printing process, by applying a corresponding magnetic field, and the position of the so oriented flakes is subsequently fixed by hardening the ink. Preferably, UV-curable ink formulations are used for this application; such formulations can be prepared as known to the skilled person.

EXAMPLE

First and second optically variable interference devices were prepared by the successive physical vapor deposition of the different layers of each a symmetric half-wave metal-dielectric interference design onto a release-coated PET carrier foil.

Chromium (Cr), Magnesium fluoride ($MgF_2$; n=1.35), Yttrium oxide ($Y_2O_3$; n=1.89), and Aluminum (Al) were deposited as know to the skilled person and described in the cited state of the art references, noteworthy using electron-beam assisted evaporation sources in a high vacuum.

First Device

Symmetric design of the absorber/dielectric/reflector/dielectric/absorber type, having the following layer sequence:
1. Absorber layer: Cr, 3.5 nanometers
2. Dielectric layer: $MgF_2$, 490 nanometers (n=1.35)
3. Reflector layer: Al, 40 nanometers
4. Dielectric layer: $MgF_2$, 490 nanometers (n=1.35)
5. Absorber layer: Cr, 3.5 nanometers Design for $2^{nd}$-order reflection maximum (k=2) at 660 nm under orthogonal incidence; yielding a $2^{nd}$-order reflection maximum at 445 nm under grazing incidence. The color-shift of the first interference device is from green (orthogonal) to magenta (grazing).

Second Device

Symmetric design of the absorber/dielectric/reflector/dielectric/absorber type, having the following layer sequence:
1. Absorber layer: Cr, 3.5 nanometers
2. Dielectric layer: $Y_2O_3$, 315 nanometers (n=1.89)
3. Reflector layer: Al, 40 nanometers
4. Dielectric layer: $Y_2O_3$, 315 nanometers (n=1.89)
5. Absorber layer: Cr, 3.5 nanometers Design for $2^{nd}$-order reflection maximum (k=2) at 600 nm under orthogonal incidence; yielding a $2^{nd}$-order reflection maximum at 510 nm under grazing incidence. The color-shift of the second interference device is from purple (orthogonal) to green (grazing).

Figure 2:
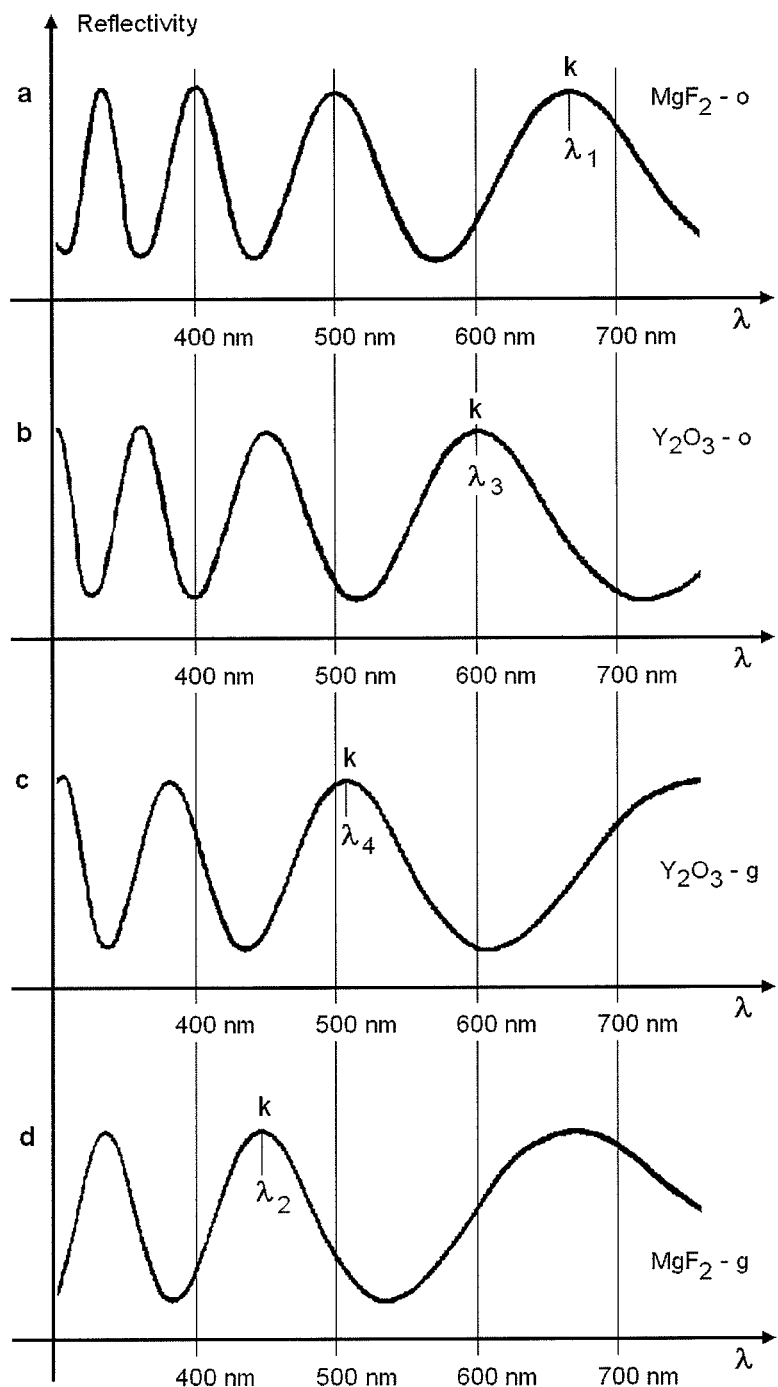
FIG. 2 illustrates the physical working principle of the security element according to the present invention:
  a) orthogonal incidence spectrum of a Cr/MgF$_2$/Al metal-dielectric interference stack;
  b) orthogonal incidence spectrum of a Cr/Y$_2$O$_3$/Al metal-dielectric interference stack;
  c) grazing incidence spectrum of a Cr/Y$_2$O$_3$/Al metal-dielectric interference stack;
  d) grazing incidence spectrum of a Cr/MgF$_2$/Al metal-dielectric interference stack.
Figure 3:
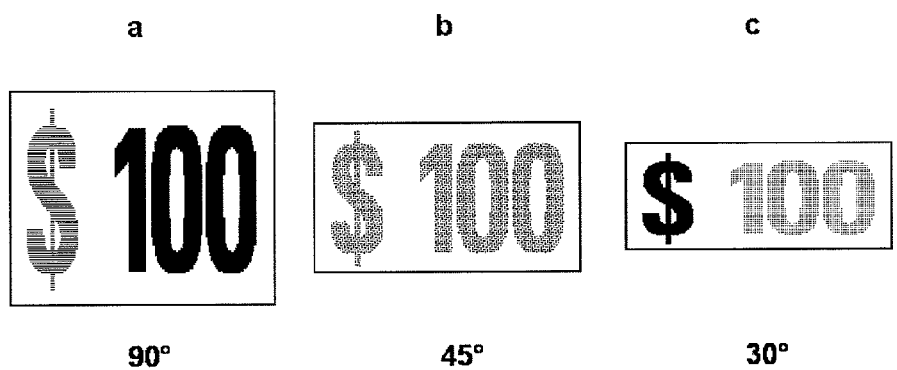
FIG. 3 schematically illustrates the paired optically variable security element of the present invention, embodied by indicia of a first (right part of the image) and of a second (left part of the image) interference device:
  a) the paired security element seen under orthogonal incidence (90°), left and right part having different colors;
  b) the paired security element seen under an incidence angle of 45°, left and right part having the same color;
  c) the paired security element seen under an incidence angle of 30°, left and right part having different colors.

The physical working principle of the paired optically variable security element according to the present invention is now explained with reference to FIG. 2 and FIG. 3.

At orthogonal incidence (FIG. 3a, right), the $Cr/MgF_2/Al$ metal-dielectric interference stack of the first device shows a reflection spectrum as indicated in FIG. 2a, having the $3^{rd}$-order reflection maximum in the blue-green, at 500 nm. The $2^{nd}$-order reflection maximum (k) is in the red, at 660 nm (first wavelength, $\lambda_1$). Upon tilting the first device to grazing incidence (FIG. 3c, right), spectrum in FIG. 2d, the $2^{nd}$-order reflection maximum moves up into the blue, at 445 nm (second wavelength, $\lambda_2$).

At orthogonal incidence (FIG. 3a, left), the $Cr/Y_2O_3/Al$ metal-dielectric interference stack of the second device shows a reflection spectrum as indicated in FIG. 2b, having the $2^{nd}$-order reflection maximum in the orange, at 600 nm (third wavelength, $\lambda_3$). Upon tilting the second device to grazing incidence (FIG. 3c, left), spectrum in FIG. 2c, the $2^{nd}$-order reflection maximum moves up into the blue-green, at 510 nm (fourth wavelength, $\lambda_4$).

The range spanned up by said third and said fourth wavelengths of said second device is thus within the range spanned up by said first and said second wavelengths of said first device. As a consequence, there is an incidence or viewing angle, at which the color-travels of said first and said second device must cross; at this crossover point the spectra, and thus the colors of both devices are equal, independent of the illumination conditions.

In the present example, the crossover point is situated at a viewing or incidence angle θ of 40° C., where both optical interference paths through the dielectric layer of the first and the second interference devices are equal. The $2^{nd}$-order reflection maximum is at 545 nm, and both devices show the same, grass-green interference color (FIG. 3b).

The so obtained interference devices can be converted to stamping foils, together forming a set of first and second optically variable interference devices for embodying a paired optically variable security element according to the present invention.

Alternatively, the obtained interference devices can be removed from the carrier foils, comminuted into pigments and converted into printing inks according to methods known to the skilled and described in the art, together forming a set of first and second optically variable coating compositions for embodying a paired optically variable security element according to the present invention.

Exemplary printing ink formulations can be prepared as follows:

Ink for the copperplate Intaglio printing process:

| | |
|---|---|
| Addition product of tung oil and maleic acid modified phenolic resin in a high boiling mineral oil (PKWF 28/31) | 35% |
| Long oil alkyd resin | 7.50% |
| Alkylphenolic resin modified with raw tung oil in ink solvent 27/29 | 16% |
| Polyethylene wax | 3.30% |
| Aerosil 200 (Degussa-Huels) | 2.00% |
| Optically variable pigment according to the invention | 30% |
| Ink solvent 27/29 (Shell Industrial Chemicals) | 6% |
| Cobalt octoate (11% metal) | 0.10% |
| Manganese octoate (10% metal) | 0.10% |

Ink for the silk-screen printing process (UV drying):

| | |
|---|---|
| Epoxyacrylate oligomer | 40% |
| Trimethylolpropane triacrylate monomer | 10% |
| Tripropyleneglycol diacrylate monomer | 10% |
| Genorad 16 (Rahn) | 1% |
| Aerosil 200 (Degussa-Huels) | 1% |
| Irgacure 500 (CIBA) | 6% |
| Genocure EPD (Rahn) | 2% |
| Optically variable pigment according to the invention | 20% |
| Dowanol PMA | 10% |

Ink for the flexographic printing process (UV-drying):

| | |
|---|---|
| Urethane acrylate oligomer | 40% |
| Glycerol propoxylated triacrylate monomer | 10% |
| Tripropyleneglycol diacrylate monomer | 15% |
| Florstab UV-1 (Kromachem) | 1% |
| Optically variable pigment according to the invention | 25% |
| Aerosil 200 (Degussa-Huels) | 1% |
| Irgacure 500 (CIBA) | 6% |
| Genocure EPD (Rahn) | 2% |

Using a corresponding set of such inks, the paired optically variable security element of the present invention can be printed in the form of indicia on a security document, such as a banknote, a value document, an identity document, an access document, a label, or a tax excise stamp, or on a commercial good.

The skilled person will be able, based on his technical knowledge, the cited prior art, and the disclosure given herein, to derive with ease further embodiments of the present invention. The present invention is noteworthy not limited to the exemplified absorber, reflector and dielectric materials, nor to the exemplified interference design, but can be practiced with other materials and interference designs, given that the principles outlined herein above are respected.

The invention claimed is:

1. A paired optically variable security element, comprising:
   a first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and
   a second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, wherein the first and the second optically variable interference devices are arranged such that they can be viewed together,
   wherein a range spanned up by said third and said fourth wavelengths of said second device is within a range spanned up by said first and said second wavelengths of said first device, and the first and the second optically variable interference devices have a same-interference design at an angle of incidence of spectral matching, and wherein, based on different refractive indexes for the first and second dielectric materials, a light propagation speed inside and outside of the first optically variable interference device is different from a light propagation speed inside and outside of the second optically variable interference device.

2. A paired optically variable security element, comprising:
a first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and
a second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, wherein the first and the second optically variable interference devices are arranged such that they can be viewed together,
wherein a range spanned up by said third and said fourth wavelengths of said second device is within a range spanned up by said first and said second wavelengths of said first device, and the first and the second optically variable interference devices have a same-interference design at an angle of incidence of spectral matching, and
wherein the first and the second optically variable interference devices have a same quarter-wave interference design at the angle of incidence of spectral matching.

3. A paired optically variable security element, comprising:
a first optically variable interference device having a first dielectric of a lower refractive index ($n_{low}$), and whose $k^{th}$-order reflection maximum (k) shows a shift from a first reflection wavelength ($\lambda_1$) at orthogonal incidence to a second, shorter wavelength ($\lambda_2$) at grazing incidence, and
a second optically variable interference device having a second dielectric of a higher refractive index ($n_{high}$), and whose same $k^{th}$-order reflection maximum (k) shows a shift from a third reflection wavelength ($\lambda_3$) at orthogonal incidence to a fourth, shorter wavelength ($\lambda_4$) at grazing incidence, wherein the first and the second optically variable interference devices are arranged such that they can be viewed together,
wherein a range spanned up by said third and said fourth wavelengths of said second device is within a range spanned up by said first and said second wavelengths of said first device, and the first and the second optically variable interference devices have a same-interference design at an angle of incidence of spectral matching, and
wherein the first and the second optically variable interference devices have a same half-wave interference design at the angle of incidence of spectral matching.

4. A paired optically variable security element, comprising:
a first optically variable interference device having a first dielectric with a first refractive index, and shows a color shift from an orthogonal incidence to a grazing incidence, and
a second optically variable interference device having a second dielectric with a second refractive index that is higher than that of the first dielectric, and shows a color shift from an orthogonal incidence to a grazing incidence,
wherein the first and the second optically variable interference devices, independent of illumination source, exhibit color matching at a predetermined angle of incidence that is between and includes the orthogonal incidence and the grazing incidence, and
wherein, based on different refractive indexes for the first and second dielectric materials, a light propagation speed inside and outside of the first optically variable interference device is different from a light propagation speed inside and outside of the second a first optically variable interference device.

5. A paired optically variable security element, comprising:
a first optically variable interference device having a first dielectric layer with a first refractive index and a first reflector layer, and shows a first optical lag that decreases from an orthogonal viewing angle to a grazing viewing angle, and
a second optically variable interference device having a second dielectric layer with a second refractive index, higher than that of the first dielectric, and a second reflector layer, and shows a second optical lag, different from the first optical lag, that decreases from an orthogonal incidence to a grazing viewing angle,
wherein different color shifts from the orthogonal viewing angle to the grazing viewing angle are exhibited in the first and second optically variable interference devices and, at a same viewing angle between and including the orthogonal viewing angle and the grazing viewing angle, a same color is exhibited in the first and second optically variable interference devices.

6. The paired optically variable security element according to claim 5, wherein the same viewing angle at which the same color is exhibited in the first and second optically variable interference devices is independent of illumination source.

7. The paired optically variable security element according to claim 5, wherein the first or second optical lag is a delay behind an incident light wave reflected from a topmost layer of the first or second optically variable interference device, respectively, by the incident light wave traveling through the first or second dielectric, being reflected by the first or second reflector, and traveling back through the first or second dielectric to emerge from the topmost layer of the first or second optically variable interference device.

* * * * *

UNITED STATES PATENT AND TRADEMARK OFFICE
CERTIFICATE OF CORRECTION

PATENT NO. : 8,998,265 B2  Page 1 of 1
APPLICATION NO. : 13/122285
DATED : April 7, 2015
INVENTOR(S) : Bleikolm et al.

It is certified that error appears in the above-identified patent and that said Letters Patent is hereby corrected as shown below:

On the title page, Item (73), "SICPA Holding SA" should read --SICPA HOLDING SA--.

In the claims

Column 14, line 23 claim 4, "the second a first optically" should read --the second optically--.

Signed and Sealed this
Ninth Day of February, 2016

Michelle K. Lee
*Director of the United States Patent and Trademark Office*